Patented Apr. 25, 1950

2,505,535

UNITED STATES PATENT OFFICE 2,505,535

PROTECTION OF IMMERSED METAL

Herbert Manfred Freud, dit Jean Frasch, Nanterre, France, assignor to Societe De Produits Chimiques Des Terres Rares, Paris, France No Drawing. Application August 3, 1946, Serial No. 688,336. In France August 13, 1945

6 Claims. (Cl. 106—14)

It is known that ferrous metals corrode (rust) particularly fast when they are simultaneously in the presence of oxygen (air) and water or water vapor. A steel sheet or iron sheet, for example, plunged into aerated water, rusts strongly, and more rapidly when warm than cold. The rust propagates itself deeper and deeper, and in a short time may pierce the sheet, thus often rendering the equipment useless.

In some cases, when the form and use of an apparatus permits it to remain constantly in contact with water, and if the temperature of the water is not too high, corrosion difficulties can be averted by suitable protective coatings, e. g. by painting or by galvanizing the ferrous metal apparatus or the parts in which water is to be left or which are to be left in contact with water can be so protected. In many cases this is not possible. Sometimes the temperature of the water becomes too high. Sometimes the form and/or dimensions or use of the piece makes painting impractical (e. g. the inside of tubes or pipes for central heating, radiators, some types of reservoirs, etc.). Painting the interior surfaces of such articles being impossible or impractical, this mode of protecting same is unavailable, and large areas are left which are subject to rusting. A further objection to painting is that it must be repeated, from time to time.

It is well known that notably in the case of ferrous articles to be in substantially continuous contact with a body of water (i. e. water or aqueous liquid that remains in the circuit, small amounts of water being added from time to time to replace evaporation and/or leakage as necessary) it is a simple matter to add to this water a passivating agent for the ferrous metal, to protect the latter.

Certain salts are known for this purpose (as passivating agents for iron), e. g. sulphites. When these are added to the water which is to remain in contact with the entire surface of the iron object, these afford protection, but only as long as the said iron object and water are to remain in contact. When the contact ceases (i. e. when the water and passivating agent are withdrawn from contact with the iron part, e. g. when the water reservoir is emptied or the iron article lifted out of the said solution or all or a part of the water has evaporated), rusting may again commence as to the parts of the ferrous metal no longer covered by such water. Thus of the interior surfaces of radiators (e. g. hot water radiators for heating houses, or automobile radiators) and cooling jackets of various apparatus, the parts which are no longer covered by the water are subject to rusting.

Other salts, e. g. chromates, used alone, have a more durable passivating action on iron and steel, but this is insufficient when the water level fluctuates constantly or frequently, e. g. in automobile radiators. Articles which can resist corrosion (e. g. receptacles) for a longer or shorter period can thus be definitely protected, when kept full of the liquid.

In French patent application P. V. 495,949 of December 28, 1944 (and corresponding U. S. application 636,067 of December 19, 1945, now abandoned, for which latter a substitute case, Ser. No. 126,042 was filed on November 7, 1949) I have described a process of protecting metals against corrosion (including rusting) by forming on their surface a coating of solution of gelatin or other analogous animal, and insolubilizing such compound by a tanning agent, such insolubilization being produced by altering the pH of the solution, or by altering the concentration of the solution, e. g. by evaporating to dryness, and further heating if desired.

I have now found that solutions of this kind in addition to their ability to form protective layers as described in said application, also have the property of passivating ferrous metal articles of the kinds above mentioned and can be utilized effectively for the protection of immersed metal articles.

The present invention has for its object, a process for protecting such metal articles, whether immersed (or in contact with an aqueous liquid) continuously or intermittently, and consists in putting into the liquid bath dissolved gelatin or analogous animal glue material and a tanning agent susceptible of insolubilizing such colloid. As such tanning agents, soluble bichromates are especially suitable for use, and (with the colloids stated) are highly effective. Accordingly, I add to the water which is to be in contact with the ferrous metal article (especially when of sheet metal) one of the solutions described in said application 636,067. Or one could add to said water the gelatin and the tanning agent, the pH of said solution, in either case, being such as to give stability to the solution e. g. pH about 4.

I have found that solutions so prepared, even if they are too dilute to permit the formation of protective layers such as those described in said prior application, have a very great passivating action, and which, if a certain amount of water is added to the solution which bathes the metal article, the latter is protected against corrosion (rusting) not only while the metal article is in contact with the solution, but also when the solution is partially or wholly removed from contact with said article.

It appears that this passivating action arises from the fact that on the surface of that portion of the article which is no longer bathed with the liquid, the evaporating water has left an insoluble film or layer of tanned gelatin (tanned animal-glue-like substance) which protects such surface.

To give examples, the following will serve to prevent internal rusting of an automobile radiator or the radiator of a heating unit.

Example 1

A cooling jacket of an engine which runs all day normally contains water, e. g. at about 80° C. In place of such water, a solution of 8.5 gr. $ZnCr_2O_7$ and 2.5 gr. of gelatin, per liter of water, is introduced, to completely fill the jacket and the radiator (engine cooling system). All through the time of running of the engine by addition of water as needed, from time to time, to replace water lost by evaporation (the engine being running) the cooling system is kept filled. The heating of the solution produces a certain insolubilization of the gelatin, which passes from the emulsoid form to the suspensoid form. The micelles of insolubilized gelatin collect on the walls of the jacket and radiator in proportion as the water level therein descends, and protects the so coated area against rusting.

When the cooling system is again filled with water, a part of the insolubilized gelatin becomes separated from this coating and passes again into the liquid phase, in which the iron surfaces are completely passive and remain so.

Theoretically, a single filling with the solution should protect the jacket and radiator indefinitely. But practically it is preferable, if the motor is to be run every day, to discharge the entire solution, e. g. once a month (more or less) and to then refill the cooling jacket and radiator.

Example 2

Another example of securing momentary protection of metallic reservoirs, during tests for water-tightness, is by immersion in water for the period up to the application of painting or varnishing the reservoirs. The above solution may be used in place of water.

Thus a receptacle being tested is plunged into a solution containing, per liter of water, 12.8 gr. of $ZnCr_2O_7$ and 4.5 gr. (dry basis) of strong animal glue. Air under pressure is introduced into the reservoir, and the assemblage is watched to see if air bubbles appear (e. g. at any defective seams, which should then be repaired). The solution, although yellowish, is prefectly clear (transparent), so that bubbles can be readily seen.

If the receptacle is found satisfactory, by this test, the receptacle is taken out, and dried (e. g. in the air), without washing. It will not rust, due to the coating of tanned glue on its surface, and this gives a good external surface to which paint will adhere well.

Other solutions which are disclosed in the co-pending case 636,067, are suitable for use in the present invention and should be added to the water or aqueous liquid with which the metal article is in constant or intermittent contact.

A satisfactory solution contained 1.5 kg. of gelatin, and the reaction products of 4 kg. chromic acid with 2.5 kg. of zinc carbonate, in 100 liters of water (pH of solution was 4.25).

Another satisfactory solution was made from 1 kg. gelatin and the reaction product of 3 kg. of chromic acid and 1.95 kg. of manganese carbonate, in 100 liters of water.

Another satisfactory solution contained 2 kg. gelatin, and the reaction products of 8 kg. chromic acid with 4.4 kg. of zinc carbonate in 100 liters of water (pH was 3.9).

Another solution, 2.1 kg. of gelatin, 4 kg. chromic acid and 2.2 kg. manganese carbonate, in 100 liters of water, (pH of solution was 4).

The invention includes, as new industrial products, the passivating solutions or the powders which form same. Such powders contain gelatin or an analogous animal glue and the specified tanning agent for same. These powders can be packaged and sold with simple instructions to dissolve same in a stated amount of water and to then apply the solutions for prevention of rusting, by the methods shown above, to ferrous metal articles.

It will be understood that in the above examples, zinc bichromate, $ZnCr_2O_7$, is used as illustrative. Manganese di-chromate could be substituted. This could be used in the same amount as the zinc bichromate. The proportions also can be varied. Thus the solution to be put into contact with the metal surface can contain e. g. from about 0.25% to 10% of gelatin or analogous animal glue, about 1% to 10% of gelatin or analogous glue and the amount of bichromate can vary between about 1% and about 20%. Preferably the amount of bichromate is more than the amount of the gelatin or animal glue, e. g. to one part of gelatin I prefer to use about 3 to 4 parts of the bichromate.

I claim:

1. A process for suppressing the corrosive action of an aqueous liquid on a metallic surface which is in constant or intermittent contact therewith, which consists in introducing into such aqueous liquid, a gelatinous substance selected from the group consisting of gelatin and an analogous animal glue material, and a tanning agent selected from the group consisting of the bichromates of zinc and manganese.

2. A process as covered in claim 1, in which the amount of said gelatinous material introduced per liter of the aqueous liquid is from about 2.5 to 4.5 grams, and in which the tanning agent is $ZnCr_2O_7$ in an amount of about 8.5 to about 12.8 grams per liter of said aqueous liquid.

3. A process of suppressing the corrosive action of an aqueous liquid on a metallic surface which is in continuous or intermittent contact therewith, which consists in introducing into such aqueous liquid about 0.25% to about 10% of a gelatinous substance selected from the group consisting of gelatin and analogous animal glue materials and a tanning agent selected from the group consisting of bichromates of zinc and of manganese, the amount of said tanning agent being about 3 to about 4 times the amount of said gelatinous material.

4. A soluble solid material, suitable for dissolving in water to suppress its action on metals, such solid material being composed essentially of a gelatinous material selected from the group consisting of gelatin and analogous animal glue, mixed with a soluble tanning agent therefor, selected from the group consisting of the bichromates of manganese and of zinc, such tanning agent being present in amount several times greater than the amount of said gelatinous material.

5. In the protection of corrodible metal surfaces from corrosion, by an aqueous liquid, the step of dissolving one part of a gelatinous substance selected from the group consisting of gelatin and an analogous animal glue, in said aqueous liquid, and dissolving in said aqueous liquid, an amount of a tanning agent selected from the group consisting of the bichromates of zinc and of manganese, which is about 3 to about 4 times the amount of said gelatinous substance.

6. An antirusting solution composed essentially of water containing in solution a gelatinous material selected from the group consisting of gelatin and analogous animal glue, mixed with a soluble tanning agent therefor, selected from the group consisting of the bichromates of manganese and of zinc, such tanning agent being present in amount several times greater than the amount of said gelatinous material.

HERBERT MANFRED FREUD DIT JEAN FRASCH.

REFERENCES CITED

The following references are of record in the file of this patent:

UNITED STATES PATENTS

| Number | Name | Date |
|---|---|---|
| 1,555,927 | Morris | Oct. 6, 1925 |
| 2,129,459 | Benoit | Sept. 6, 1938 |
| 2,148,862 | Kern | Feb. 28, 1939 |
| 2,196,128 | Stuart | Apr. 2, 1940 |

FOREIGN PATENTS

| Number | Country | Date |
|---|---|---|
| 492,445 | Great Britain | Sept. 20, 1938 |

Certificate of Correction

Patent No. 2,505,535                                                                                April 25, 1950

HERBERT MANFRED FREUD, dit JEAN FRASCH

It is hereby certified that error appears in the printed specification of the above numbered patent requiring correction as follows:

Column 2, line 19, after the word "animal" and before the comma, insert *glue*; column 4, lines 32 and 33, strike out "about 1% to 10% of gelatin or analogous glue";

and that the said Letters Patent should be read as corrected above, so that the same may conform to the record of the case in the Patent Office.

Signed and sealed this 14th day of November, A. D. 1950.

[SEAL]

THOMAS F. MURPHY,
                                                                                    *Assistant Commissioner of Patents.*